United States Patent [19]
Martin et al.

[11] Patent Number: 5,310,020
[45] Date of Patent: May 10, 1994

US005310020A

[54] SELF CONTAINED LUBRICATING OIL SYSTEM FOR A CENTRIFUGAL COMPRESSOR

[75] Inventors: Daniel T. Martin, Clemmons; Donald G. Smith, Mocksville, both of N.C.

[73] Assignee: Ingersoll-Rand Company, Woodcliff Lake, N.J.

[21] Appl. No.: 74,235

[22] Filed: Jun. 9, 1993

[51] Int. Cl.$^5$ .............................................. F01M 9/00
[52] U.S. Cl. ..................................... 184/6.3; 184/6.1; 184/6.4; 184/6.22; 184/104.1; 184/108; 417/228
[58] Field of Search ................... 184/6.1, 6.3, 6.4, 6.5, 184/6.22, 104.1, 31, 6.16, 108; 417/228

[56] References Cited

U.S. PATENT DOCUMENTS

| | | | |
|---|---|---|---|
| 3,186,630 | 6/1965 | Lamberton et al. | 417/228 |
| 4,526,523 | 7/1985 | Parker | 417/228 |
| 4,605,357 | 8/1986 | Keith | 184/6.3 |
| 5,038,893 | 8/1991 | Willner et al. | 184/6.4 |

FOREIGN PATENT DOCUMENTS

| | | | |
|---|---|---|---|
| 0131893 | 10/1981 | Japan | 184/6.3 |
| 0120997 | 5/1988 | Japan | 184/6.1 |

Primary Examiner—Thomas E. Denion
Attorney, Agent, or Firm—Victor M. Genco, Jr.

[57] ABSTRACT

A compressor includes an air cooled lubricant temperature regulator and an engine for providing motive force to the compressor. A first, electric-driven, self-priming pump provides a supply of lubricant to the compressor prior to starting the engine and for a predetermined period of time after the engine is operating. The first pump is flow connected in fluid receiving relation with a lubricant reservoir. A first electronic controller means directs compressor operations, including directing operation of the first pump. A second electronic controller, external to the first controller means, directs operation of the first pump after engine operation. A second, compressor-driven, self-priming pump provides a primary lubricant pumping function during engine operation at predetermined run speeds. A valve means is flow connected intermediate the discharge of the first pump and the discharge of the second pump for preventing lubricant cross flow between the first and second pumps during simultaneous operation thereof. The first pump preprimes the second pump to facilitate the self-priming duty of the second pump.

5 Claims, 4 Drawing Sheets

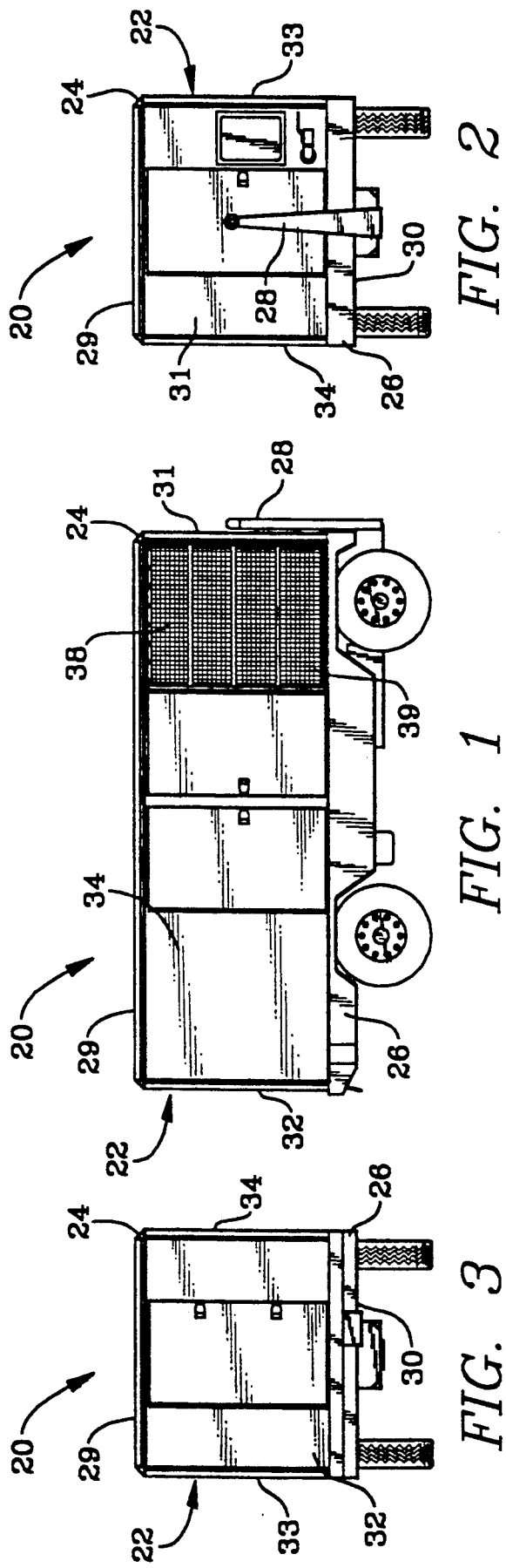

SELF CONTAINED LUBRICATING OIL SYSTEM FOR A CENTRIFUGAL COMPRESSOR

BACKGROUND OF THE INVENTION

This invention generally relates to compressors, and more particularly to a self-contained lubricating oil system for a portable, diesel-driven, microprocessor-based, centrifugal compressor.

Portable compressors operate in diverse geographic regions which have environmental conditions ranging from arctic conditions to desert conditions. Portable compressor lubrication systems must function in such diverse geographic regions to permit efficient compressor operations. While present portable compressor lubrication systems may have operated with some degree of success in these diverse geographic regions, these lubrication systems are replete with a multiplicity of deficiencies and shortcomings which have detracted from their usefulness. For example, present lubrication systems do not effectively pre-lubricate the compressor system prior to compressor loading, do not constantly monitor system oil pressure at a plurality of fluid points to predict and analyze compressor system malfunctions, and do not effectively preprime main system oil pumps to reduce oil pump wear.

The foregoing illustrates limitations known to exist in present portable compressors. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a self-contained lubrication system for a compressor having an inlet port, a discharge port, and an oil supply port. An engine provides a motive force to the compressor. A first, electric-driven, self-priming pump, having an inlet and a discharge, provides a supply of lubricant to the compressor prior to starting the engine and for a predetermined period of time after the engine is operating. The first pump is flow connected in fluid receiving relation with a lubricant reservoir. A first electronic controller means directs compressor operations, including directing operation of the first pump. A second electronic controller means, external to the first controller means, directs operation of the first pump after engine operation. A second, compressor-driven, self-priming pump having an inlet and a discharge, provides a primary lubricant pumping function during engine operation at predetermined run speeds. A valve means is flow connected intermediate the discharge of the first pump and the discharge of the second pump for preventing lubricant cross flow between the first and second pumps during simultaneous operation thereof. A conduit means flow connects the discharge of the first pump with the inlet of the second pump such that the first pump preprimes the second pump to facilitate the self-priming duty of the second pump. An air cooled lubricant temperature regulator controls the temperature of the lubricant.

The foregoing and other aspects will become apparent from the following detailed description of the invention when considered in conjunction with the accompanying drawing figures.

BRIEF DESCRIPTION OF THE DRAWING FIGURES

FIG. 1 is a side view of a portable, diesel-driven centrifugal compressor which includes the self-contained lubricating oil system of the present invention;

FIG. 2 is a front view of the portable, diesel-driven centrifugal compressor illustrated in FIG. 1;

FIG. 3 is a rear view of the portable, diesel-driven centrifugal compressor illustrated in FIG. 1;

DETAILED DESCRIPTION

Figure 4:
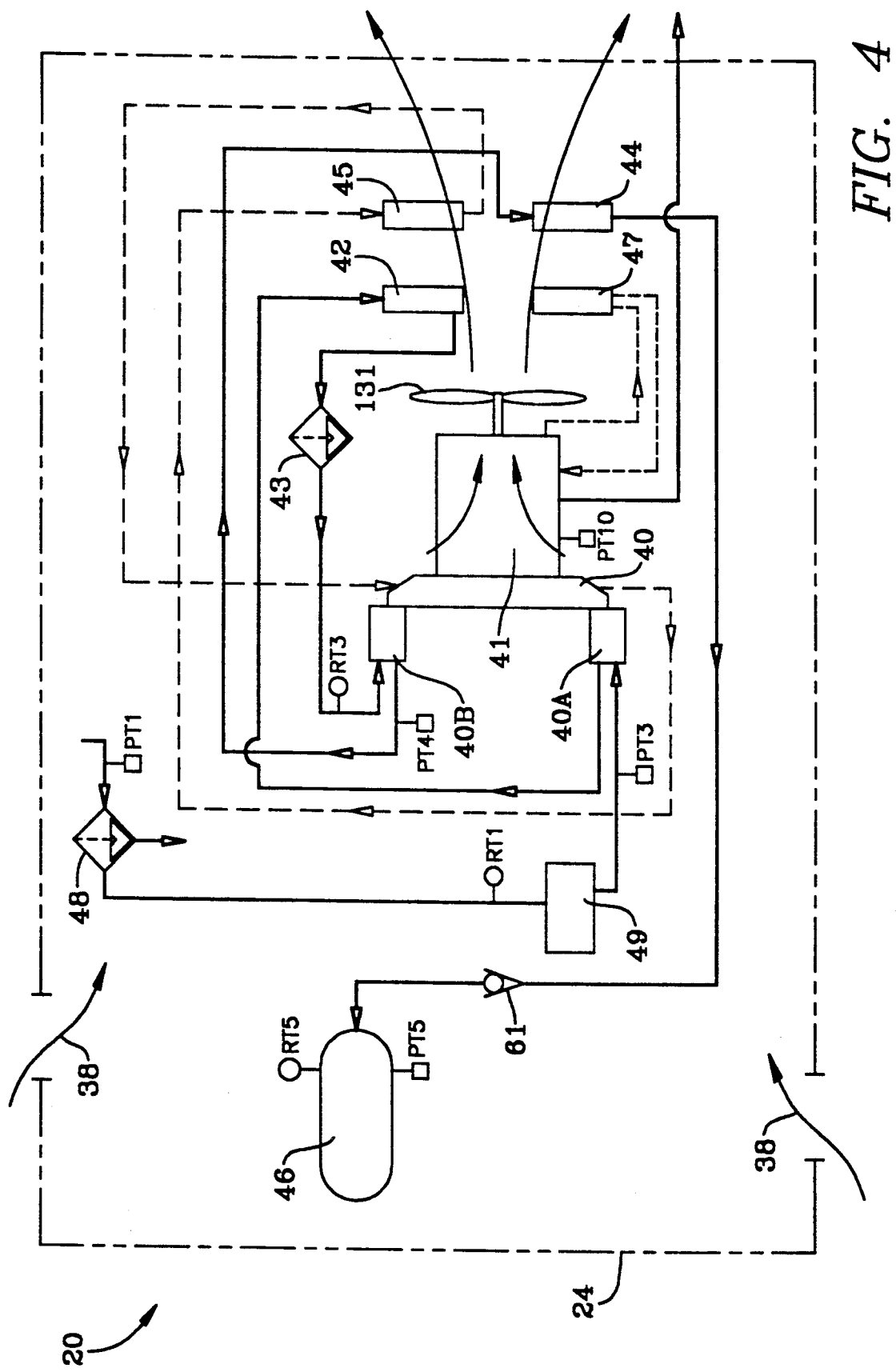
FIG. 4 is a functional schematic of a compressed air system of the portable, diesel-driven centrifugal compressor of FIGS. 1-3.

Referring now to FIGS. 1-3, a portable, diesel-driven centrifugal compressor is generally illustrated at 20. The apparatus 20 includes an upper compressor package portion 22 which is enclosed by a housing 24, and a full-chassis and running gear portion 26 which includes a tow bar assembly 28. The portable compressor 20 has a top portion 29, a bottom portion 30, a front portion 31, a rear portion 32, a left portion 33, and a right portion 34. An engine exhaust pipe outlet (not shown) and a cooling air exhaust area (not shown) are located at the rear of the top portion 29. A large ambient air intake 38 is located on each the left side and the right side of the housing. The ambient air intakes 38 are each covered by a protective grill 39 which prevents foreign debris from entering the interior of the compressor housing 24 during operation.

FIG. 4 illustrates a compressed air system having the following major system components: a two stage centrifugal compressor or airend 40, having a first stage 40A, a second stage 40B, and a casing (not shown); a prime mover 41, such as a diesel engine having a casing (not shown); an intercooler 42; a water separator 43; an aftercooler 44; an oil cooler 45; a receiver tank 46; and an engine radiator 47. These major system components will be described in further detail hereinafter. Although a two-stage centrifugal compressor or airend 40 is described herein, it is anticipated that the teachings of the present invention apply equally to compressed air systems having one stage or more than two stages, as well.

Referring to FIG. 4, airend intake air is drawn from within the housing 24 and flows through two intake filters 48 which are disposed in a parallel fluid arrangement, and which are connected to a common plenum. The filtered intake air then flows from the common plenum through an inlet duct (not shown) to an inlet control valve 49.

The compressor 20 includes a microprocessor-based electronic controller 51, described in further detail hereinafter, which directs operation of the compressor 20, including the self-contained lubrication system. Additionally, the compressor 20 includes instrumentation fluidly disposed in the intake air path upstream of the first stage of the airend. This instrumentation includes the following sensors: a pressure sensor PT1 fluidly disposed upstream of the air intake filters 48, sensor PT1 sensing ambient barometric pressure; a temperature sensor RT1 fluidly disposed upstream of the inlet control valve 49, sensor RT1 sensing stage 1 inlet temperature; and a pressure sensor PT3 which senses stage 1 inlet vacuum.

Air entering the first stage 40A of the airend 40 is compressed to an intermediate predetermined pressure of approximately 35 PSIG. The air exits the first stage and flows through an interstage duct (not shown) to the intercooler 42 for cooling prior to entering stage two for final compression. Cooled and saturated interstage air then leaves the intercooler 42 and flows through the water separator 43. The water separator 43 removes remaining water droplets prior to the air entering the airend second stage 40B. Interstage air then flows from the water separator 43 to the airend 40 for second stage compression. Instrumentation present within the interstage air path includes a temperature sensor RT3 which measures second stage inlet temperature.

Interstage air is compressed by the second stage 40B to a pressure equal to 3–4 PSI above receiver tank pressure. The second stage compressed air exits the second stage 40B and flows through the afterstage discharge duct (not shown) to the aftercooler 44 for final cooling wherein which it is cooled to approximately 55° F. above ambient temperature. Cooled and saturated second stage compressed air then flows from the aftercooler at an aftercooler discharge through a spring-loaded wafer-style check valve 61, which is mounted at the inlet of the receiver tank 46. Instrumentation which is present within the afterstage air path includes a pressure sensor PT4 which senses stage 2 outlet pressure, a pressure sensor PT5 which senses receiver tank pressure, and a temperature sensor RT5 which senses receiver tank temperature. Additionally, diesel engine oil pressure is measured by a pressure sensor PT10.

Figure 5:
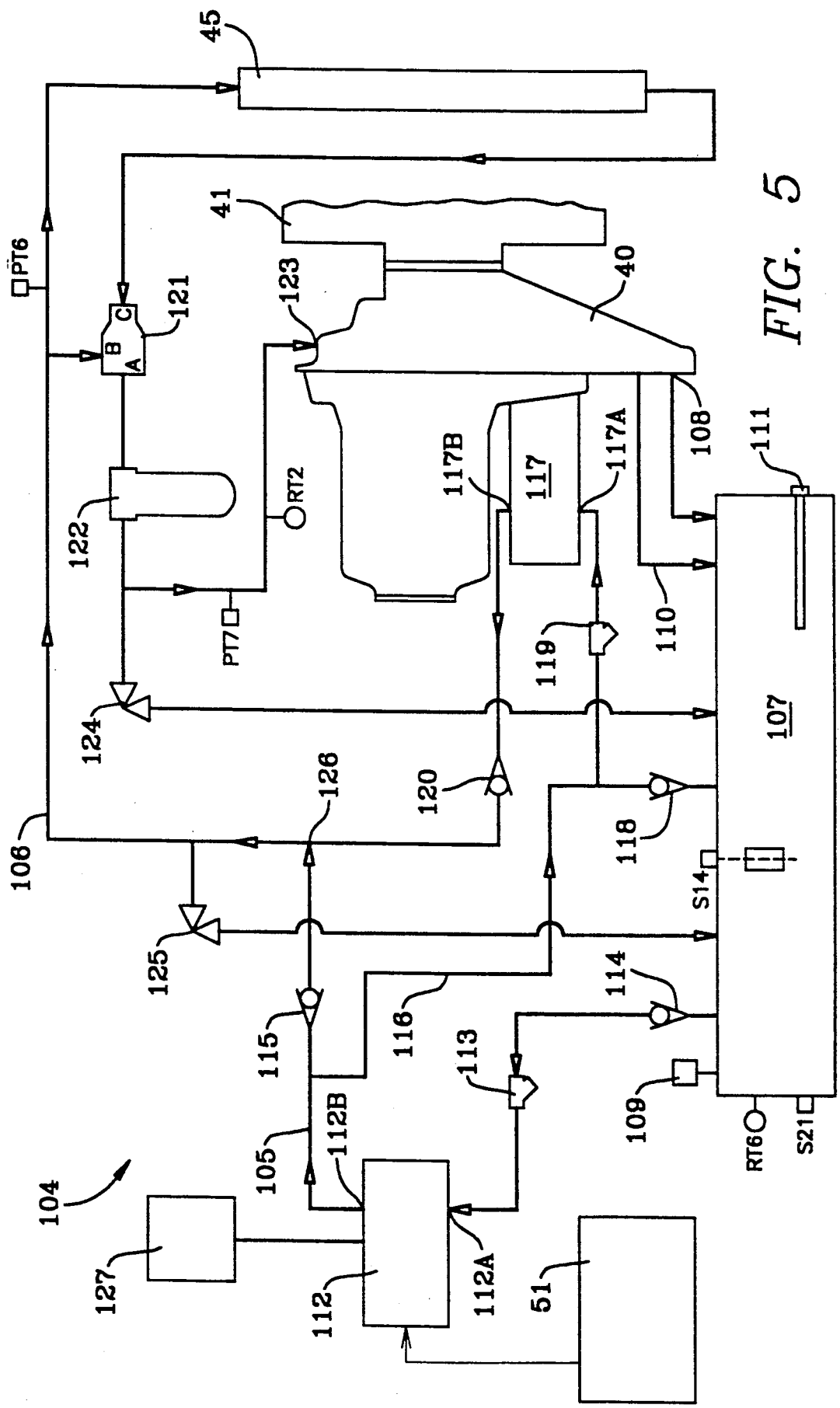
FIG. 5 is a functional schematic of the self-contained lubricating oil system according to the present invention.

FIG. 5 shows generally at 104 a self-contained lubrication system for a compressor according to the present invention. As illustrated by FIG. 5, the lubrication system 104 includes a prelubrication pump circuit 105 and a main lubrication pump circuit 106, both circuits being described in further detail hereinafter.

A chassis-mounted oil reservoir or sump tank 107 holds lubricant for the lubricating oil system 104. The sump tank is initially factory charged with 30 gallons of a suitable lubricant, such as MIL-L-23699C, for example. After initial startup of the compressor 20, approximately 5 gallons of oil are retained in the lubricating oil system 104, leaving a normal capacity of 25 gallons in the sump tank. The sump tank 107 is flow connected to an airend bottom oil drain 108 which is disposed at an airend gearcase location. Lubricant leaving the airend 40 through the drain 108 flows by gravity to the sump tank 107. Instrumentation is mounted in sensing relation on the sump tank 107, the instrumentation includes a sump tank lubricant temperature sensor RT6, a lubricant level switch S14, and a high temperature shutdown switch S21. Lubricant level switch S14 provides for emergency shut down of the compressor 20 upon reaching a dangerous lubricant level. The compressor can be shutdown in the event of high temperatures at RT6. Switch S21 is an emergency high temperature switch which is set at the highest level the system can sustain, 220° F.

The sump tank 107 is vented through a porous-metal breather vent 109 which is mounted at a top portion of the sump tank. A vent line 110 flow connects the airend gearcase with the sump tank 107. The vent line 110 permits the sump tank 107 and the airend gearcase to function at near ambient pressure to ensure that a back pressure is not created that would prevent a disruption in the airend lubrication. A heating apparatus 111, such as a 1000 Watt, 115 VAC heating unit, permits the lubricating oil system 104 to function in arctic conditions by providing initial heating of the lubricant to a minimum temperature required for starting.

The prelubrication pump circuit 105 includes a 24VDC motor-driven, self-priming prelubrication pump 112 having an inlet 112A and a discharge 112B. The pump 112 provides initial lubrication to airend bearings prior to starting the engine 41. The electronic controller 51 directs operation of the prelubrication pump 112. Referring to FIG. 5, the prelubrication pump 112 is flow connected with the sump tank 107 by way of a Y-strainer 113 and a check valve 114. The Y-strainer provides coarse straining to prevent large particles from flowing to the prelubrication pump 112. The check valve 114 is operable to ensure that the line downstream of the prelubrication pump is always full of oil to ensure that the self-priming duty of the prelubrication pump is minimal. The prelubrication pump delivers oil into the main lubrication circuit 106 through a suitably-sized discharge check valve 115 which prevents any oil from bypassing the airend 40 when the prelubrication pump 112 is deactivated. A conduit or hose 116 flow connects the prelubrication pump discharge 112B to a main pump suction, which is discussed further hereinafter.

The main lubrication pump circuit 106 includes a self-priming main oil pump 117 which is airend-driven at gear shaft engine speed, and which includes an inlet 117A and a discharge 117B. The main oil pump provides the main oil pumping function once the engine is operating at predetermined run speeds. When operating, the main oil pump 117 draws oil from the sump tank 107 to the inlet 117A through a check valve 118 and a Y-strainer 119. Oil lubricant flows from the main oil pump 117, through a discharge check valve 120, to an oil temperature control valve 121. Hose 116 connects the prelubrication pump discharge 112B with the main oil pump suction 117A, thereby providing a prepriming function for the main oil pump 117 to reduce main oil pump wear.

The oil temperature control valve 121 is a "mixing-mode" valve having a 130° F. thermostat which ensures that oil is delivered to the airend 40 at a temperature no less than 130° F. Lubricant temperature regulation is accomplished by causing a predetermined volume of oil to bypass the oil cooler 45 to thereby regulate the temperature of the oil flowing to the airend. Under high ambient conditions, the oil temperature control valve 121 causes nearly all the hot oil to flow to the oil cooler for cooling. Under low ambient conditions, only a portion of the hot oil is sent to the oil cooler 45. Lubricant flowing from the oil temperature control valve 121 flows to an oil filter 122 which filters the lubricant to 3 microns. Lubricating oil is then delivered to an airend oil supply port 123. Oil pressure within the main lubrication pump circuit 106 is regulated to 25 PSIG by an oil pressure regulating valve 124 which bypasses excess oil back to the sump tank 107 to maintain constant oil supply pressure to the airend supply port 123. Oil pressure within the prelubrication circuit is regulated by an oil pressure regulating valve 125. The main lubrication pump circuit 106 also includes a 150 PSIG relief valve (not shown) which directs oil directly to the sump tank 107 when relieving. Instrumentation in the main lubrication pump circuit includes an oil cooler inlet pressure sensor PT6, an airend oil supply pressure sensor PT7, and an airend oil supply temperature sensor RT2.

In operation, when a user directed signal is inputted to the electronic controller 51, the prelubrication pump 112 is actuated for approximately 10 seconds before the engine 41 is cranked. The prelubrication pump 112 operates continuously during cranking and while the engine is idling. At idle speeds of 1000 RPM, both the prelubrication pump 112 and the main oil pump 117 are operating delivering oil to a fluid point 126. Back flow or cross flow is prevented by the check valves 115 and 120. When the compressor is loaded and the engine is accelerated to a predetermined speed, the prelubrication pump 112 is deactivated because the main oil pump is able to carry the entire lubricating duty. Therefore, the prelubrication pump is utilized for prelubrication duty and for providing supplemental oil flow at engine idle speeds. When the engine 41 is stopped, a controller 127, such as a timed based backup circuit which is external to the controller 51, causes the prelubrication pump 112 to instantly start and to run for a predetermined amount of time, about 10 seconds after the engine has reached 0 RPM.

Figure 6:
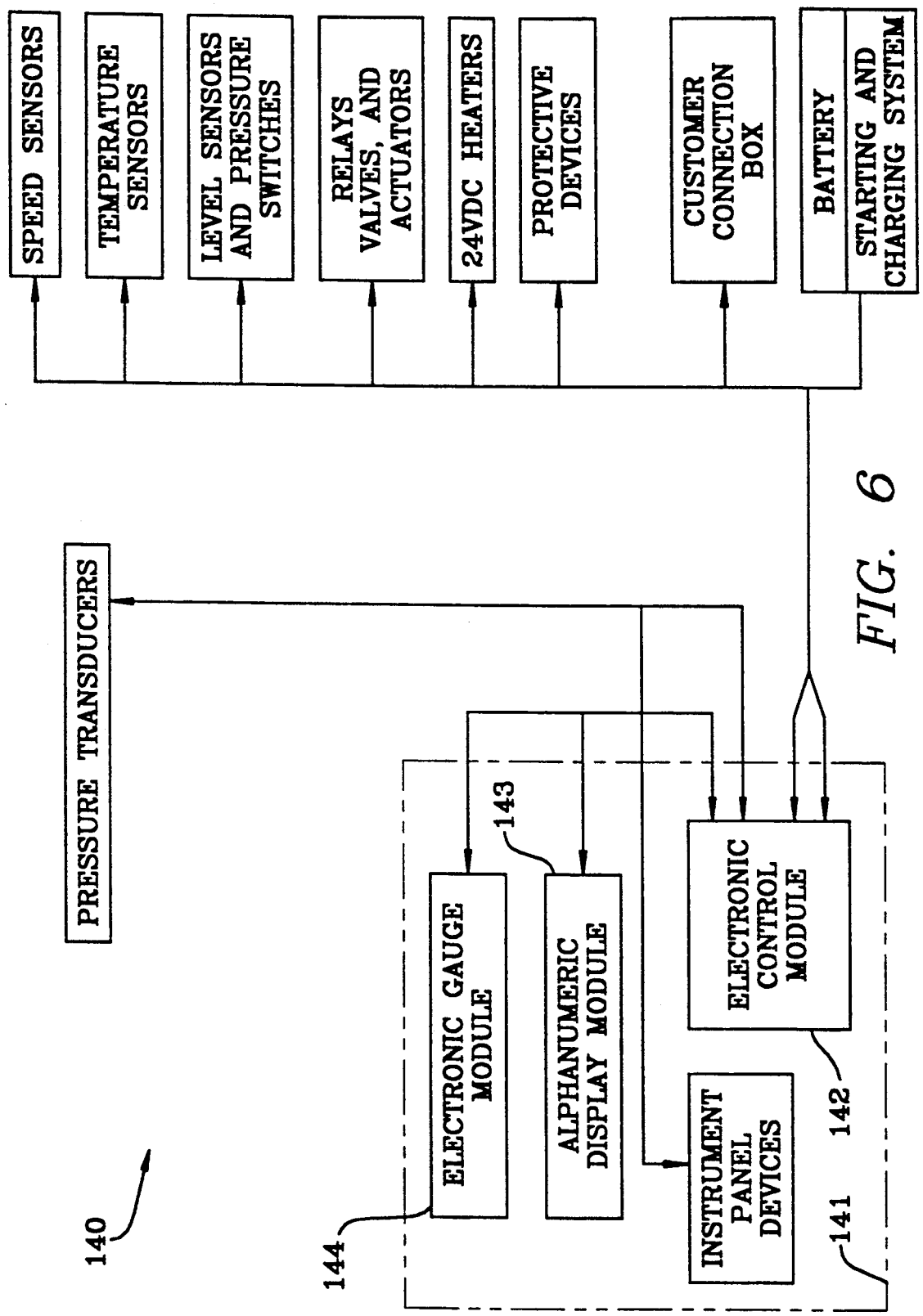
FIG. 6 is a block diagram of an electronic compressor control system.

FIG. 6 provides a functional block diagram of a compressor electrical control system 140 which includes the microprocessor-based electronic controller 51 which provides complete control of the compressor 20. The electronic control system 140 includes an electronic control module 142, an alphanumeric display module 143, and an electronic gauge module 144. The electronic control module 142 includes the electronic controller 51 and primary control switches and indicator lamps, namely a start switch, a load switch, an unload switch, a stop switch, a start mode lamp, a ready lamp, a loaded lamp, and a stop lamp.

The alphanumeric display module 143 includes a message display 145, a digital display 146, an alert/shutdown lamp, and various switches for communicating with the electronic controller 51. The message display 145 is a two line by sixteen character display which provides a user with diagnostic information, operational status messages, and the name of a measured parameter being displayed in the digital display 146. The digital display 146 provides a numeral which corresponds to a displayed operational status message. The message display 145 provides machine operational status messages to a user, enables a user to monitor compressor operating parameters, displays diagnostic messages indicating when service is needed to an element of the compressor 20, displays causes of automatic shutdowns, permits a user to program certain operational features, and permits a user to perform certain service and troubleshooting techniques.

The electronic gauge module 144 includes a plurality of lighted liquid crystal display (LCD) bar graph units which may display such information as the amount of fuel in tanks, engine oil pressure, engine coolant temperature, and service air temperature.

The electronic controller 51 provides a full complement of diagnostics and automatic shutdowns to protect the compressor 20 from damage when in need of maintenance or in the event of malfunction. For example, if the pressure difference between pressure sensor PT6 and PT7 reaches a predetermined value, the controller 51 will signal, by way of the alphanumeric display module, that the oil filter 122 is blocked needing replacement. When the electronic controller 51 detects a compressor operating parameter above normal operating limits, an alert message will be displayed on the message display 145 and the alert/shutdown lamp will flash.

When the electronic controller detects an operating parameter at a dangerously high or low level or if a critical sensor is malfunctioning, the machine will be automatically unloaded and stopped with the cause of the shutdown shown on message display. The alert/shutdown lamp will be illuminated steady when a shutdown condition exists.

While this invention has been illustrated and described in accordance with a preferred embodiment, it is recognized that variations and changes may be made therein without departing from the invention as set forth in the following claims.

Having described the invention, what is claimed is:

1. A self-contained lubrication system for a compressor, the lubrication system comprising:

a compressor having an inlet port, a discharge port, and an oil supply port:

engine means for providing a motive force to the compressor;

a lubricant reservoir;

a first, electric-driven, self-priming pump, having an inlet and a discharge, for providing a supply of lubricant to the compressor prior to starting the engine means and for a predetermined period of time after the engine is operating, the first pump means flow connected in fluid receiving relation with the lubricant reservoir;

first electronic controller means for directing compressor operations, including directing operation of the first pump;

second electronic controller means, external to the first controller means, for directing operation of the first pump for a predetermined period of time after engine operation;

a second, compressor-driven, self-priming pump having an inlet and a discharge, the second pump providing a primary lubricant pumping function during engine operation at predetermined run speeds, the second pump means flow connected in fluid receiving relation with the lubricant reservoir;

valve means flow connected intermediate the discharge of the first pump and the discharge of the second pump for preventing lubricant cross flow between the first and second pumps during simultaneous operation thereof;

conduit means for flow connecting the discharge of the first pump with the inlet of the second pump such that the first pump preprimes the second pump to facilitate the self-priming duty of the second pump; and air cooled lubricant temperature regulator.

2. A self-contained lubrication system for a compressor, as claimed in claim 1, and wherein the lubrication system further comprises:

temperature sensing means for measuring the lubricant temperature in the lubricant reservoir, the temperature sensing means disposed in electronic signal transmitting relation to the first electronic controller, and wherein the first electronic controller is operable to direct compressor operation in response to the temperature sensing means.

3. A self-contained lubrication system for a compressor, as claimed in claim 1, and wherein the lubrication system further comprises:

first pressure sensing means flow connected with an inlet of the air cooled temperature regulator, and disposed in electronic signal transmitting relation with the first electronic controller means;

a lubricant filter flow connected with a discharge of the air cooled temperature regulator; and second pressure sensing means flow connected at the inlet of the compressor oil supply port, and disposed in electronic signal transmitting relation with the first electronic controller means, and wherein during compressor operation, the first and second pressure sensing means continuously input pressure data to the first controller means which directs compressor operation in response to the pressure data.

4. A self-contained lubrication system for a compressor, as claimed in claim 1, and wherein the lubrication system further comprises:

a means for initially heating the lubricant in the lubricant reservoir to permit compressor starting in cold weather environments.

5. A self-contained lubrication system for a compressor, the lubrication system comprising:

a compressor having an inlet port, a discharge port, and an oil supply port;

engine means for providing a motive force to the compressor;

a lubricant reservoir;

a first, electric-driven, self-priming pump, having an inlet and a discharge, for providing a supply of lubricant to the compressor prior to starting the engine means and for a predetermined period of time after the engine is operating, the first pump means flow connected in fluid receiving relation with the lubricant reservoir;

first electronic controller means for directing compressor operations, including directing operation of the first pump;

second electronic controller means, external to the first controller means, for directing operation of the first pump for a predetermined period of time after engine operation;

a second, compressor-driven, self-priming pump having an inlet and a discharge, the second pump providing a primary lubricant pumping function during engine operation at predetermined run speeds, the second pump means flow connected in fluid receiving relation with the lubricant reservoir;

valve means flow connected intermediate the discharge of the first pump and the discharge of the second pump for preventing lubricant cross flow between the first and second pumps during simultaneous operation thereof;

conduit means for flow connecting the discharge of the first pump with the inlet of the second pump such that the first pump preprimes the second pump to facilitate the self-priming duty of the second pump; and air cooled lubricant temperature regulator, and wherein during operation, the first pump means is actuated by the first electronic controller means for a predetermined period of time before the engine means is cranked to start, the first pump operating continuously during cranking and during engine operation at predetermined engine idle speeds at which the first pump and the second pump operate simultaneously to deliver lubricant to a predetermined fluid point in the system, and when the compressor is loaded and the engine is accelerated to a predetermined speed, the first pump is deactivated, and when the engine is stopped, the second electronic controller means causes the first pump to instantly start and to run for a predetermined period of time after the engine has ceased operating.

* * * * *